(12) United States Patent
Schlereth et al.

(10) Patent No.: US 12,214,843 B2
(45) Date of Patent: Feb. 4, 2025

(54) GEAR UNIT FOR A TWO-WHEELED VEHICLE

(71) Applicant: REVOLUTE GmbH, Kassel (DE)

(72) Inventors: Daniel Schlereth, Münnerstadt (DE); Caspar Braun, Kassel (DE); Maximilian Benderoth, Düsseldorf (DE)

(73) Assignee: REVOLUTE GmbH, Kassel (DE)

( * ) Notice: Subject to any disclaimer, the term of this patent is extended or adjusted under 35 U.S.C. 154(b) by 0 days.

(21) Appl. No.: 18/687,339

(22) PCT Filed: Jul. 5, 2022

(86) PCT No.: PCT/EP2022/068623
§ 371 (c)(1),
(2) Date: Feb. 28, 2024

(87) PCT Pub. No.: WO2023/030724
PCT Pub. Date: Mar. 9, 2023

(65) Prior Publication Data
US 2024/0270348 A1    Aug. 15, 2024

(30) Foreign Application Priority Data
Sep. 1, 2021   (DE) .......................... 102021122592.2

(51) Int. Cl.
*B62M 11/18*        (2006.01)
*B62M 11/16*        (2006.01)
(Continued)

(52) U.S. Cl.
CPC ............. *B62M 11/16* (2013.01); *B62M 11/18* (2013.01); *F16H 63/18* (2013.01); *F16H 2063/3073* (2013.01); *F16H 2063/3096* (2013.01)

(58) Field of Classification Search
CPC ........ B62M 11/16; B62M 11/18; F16H 63/18; F16H 2063/3073; F16H 2063/3096
See application file for complete search history.

(56) References Cited

U.S. PATENT DOCUMENTS

| 2011/0011193 A1 | 1/2011 | Matsumoto |
| 2013/0150200 A1* | 6/2013 | Schmitz ................. B62M 11/04 475/207 |

(Continued)

FOREIGN PATENT DOCUMENTS

| DE | 1049714 B | 1/1959 |
| DE | 102009060484 A1 | 6/2011 |

(Continued)

*Primary Examiner* — Tisha D Lewis
(74) *Attorney, Agent, or Firm* — DINSMORE & SHOHL LL-P

(57) ABSTRACT

A shift system for shifting a gear unit has at least one movably disposed selector shaft and at least one switch element. The selected position of the switch element is changed by movement of the selector shaft relative to the switch element. A drive shaft is rotatable about a center axis. In a first selected position of the switch element, it can be connected to co-rotate at least in one direction of rotation to a component of the gear unit. In a second selected position of the switch element, it can be disconnectable from the component of the gear unit in each direction of rotation. At least a part of the switch element co-rotates with a rotation of the drive shaft about the center axis, so that relative movement of the switch element with respect to the selector shaft is generated. A gear unit has such a switch system.

16 Claims, 4 Drawing Sheets

(51) Int. Cl.
 *F16H 63/18* (2006.01)
 *F16H 63/30* (2006.01)

(56) References Cited

U.S. PATENT DOCUMENTS

2014/0090500 A1* 4/2014 Schmitz .............. B62M 11/145
 74/335
2021/0107595 A1* 4/2021 Donner .................. F16D 41/32
2023/0075440 A1* 3/2023 Braun ...................... F16H 3/66

FOREIGN PATENT DOCUMENTS

| EP | 0910530 B1 | 4/2003 |
| EP | 2718174 A1 | 4/2014 |

* cited by examiner

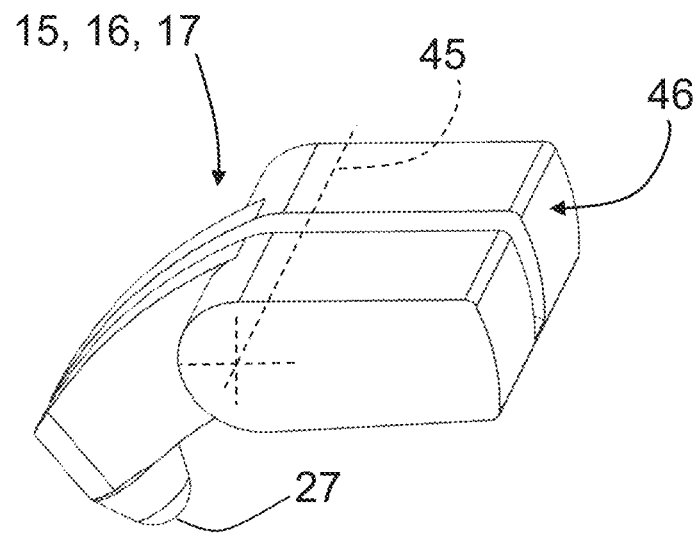
Fig. 7
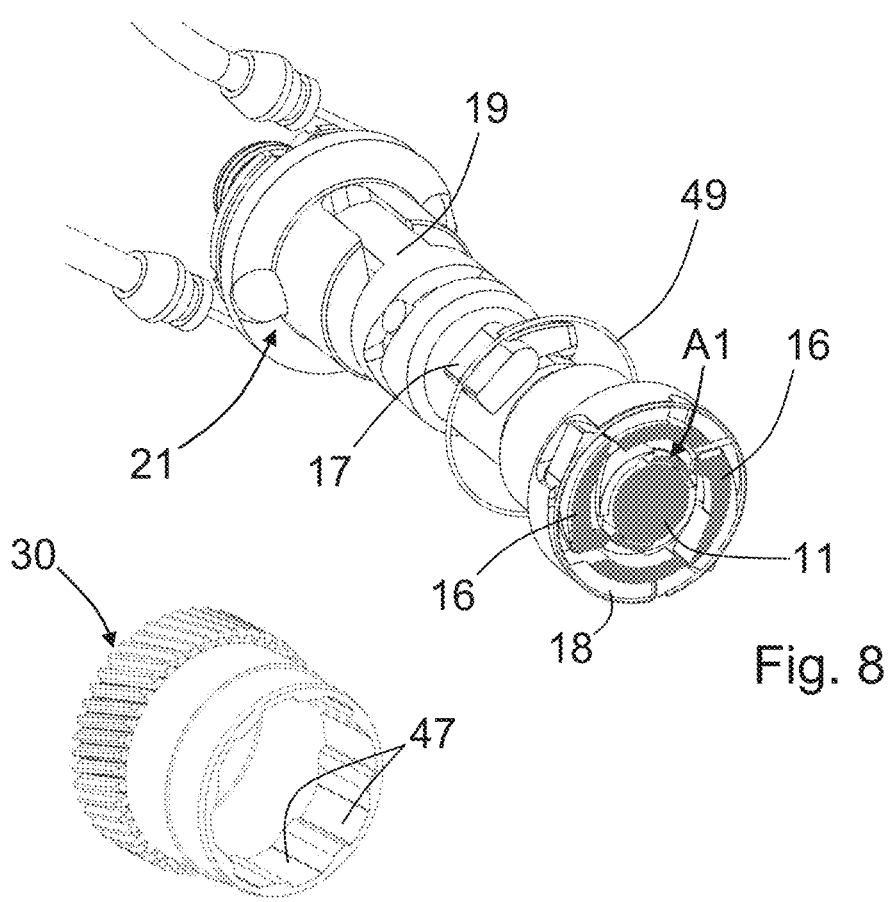
Fig. 8
Fig. 8a

GEAR UNIT FOR A TWO-WHEELED VEHICLE

CROSS-REFERENCE TO RELATED APPLICATIONS

This application is the U.S. National Stage of PCT/EP2022/068623 filed Jul. 5, 2022, which claims priority to German Patent Application No. 10 2021 122 592.2, filed Sep. 1, 2021, the content of both of which are incorporated herein by reference in their entirety.

FIELD OF THE INVENTION

The invention relates to a shift system for shifting a gear unit comprising at least one movably arranged selector shaft and at least one switch element, wherein the selected position of the switch element is variable relative to the switch element by a movement of the selector shaft, and wherein a drive shaft rotatable about a center axis is configured as part of the shift system in such a way that it is rotationally fixedly connected to a component of the gear unit in at least one direction of rotation in a first selected position of the switch element, and is disconnectable from the component of the gear unit in any direction of rotation in a second selected position of the switch element, whereas the switch element is configured in conjunction with the drive shaft such that at least a portion of the switch element co-rotates about the center axis with a rotation of the drive shaft.

BACKGROUND OF THE INVENTION

EP 0 915 800 B1 shows a shift system of the category for shifting a gear unit of a bicycle that can be attached to a frame of the bicycle. The gear unit here forms a wheel hub so that the driven wheel of the bicycle can be supported by the gear unit and the spokes of the wheel can be attached to a casing of the gear unit.

The gear change takes place by means of a shifting unit by the shifting of switch element to fix and selectively release individual components of a planetary gear of the gear unit, for example at a passage shaft, at the casing, or at an idling passage shaft of the gear unit. In this respect, the components of the planetary gear are provided with freewheels so that an interaction between the shifting of the switch element and the freewheels allows the setting of a plurality of speeds of the gear unit.

The shift system has a stationary hollow shaft as the passage shaft that is screwed to the frame of the two-wheeled vehicle and a camshaft is inserted into the hollow shaft that can be set stepwise into a rotational movement by the rider of the two-wheeled vehicle via a rotation activator to bring the shift pawls into and out of engagement with the components of the planetary gear in different rotational positions of the camshaft.

To bring a switch element out of engagement with the component of the planetary gear, the force flow from the drive has to be interrupted since there is as a rule insufficient force for the rotation of the camshaft via the switch force of the rotational activator. As a consequence of this, an interruption of the power throughput of the gear disadvantageously has to take place, which is in particular unwanted when driving uphill on a bicycle.

A further example for a gear unit shiftable by a shift system is known from EP 0 910 530 B1. This embodiment of the gear unit also serves as a wheel hub for the driven wheel of a bicycle and such wheel hub gears serve as alternatives to derailleur gears. The advantage of such shift systems in conjunction with a gear unit is found in the compact, closed manner of construction so that a grime-sensitive and maintenance intensive derailleur gear can be dispensed with and so that it can be used for bicycles, but also for two-wheeled vehicles of any other kind, for example electric bikes, electric scooters, electric motorbikes, or also conventional motorcycles having an internal combustion engine.

A further shift system is known from DE 10 2009 060 484 A1, wherein the shift system is used to connect a transmission unit and has at least one movably arranged shift shaft and at least one shift means, wherein the shift position of the shift means can be changed by a movement of the shift shaft relative to the shift means, wherein a drive shaft rotatable about a center axis is arranged as part of the shift system, which, in a first shift position of the shift means, can be connected to a component of the transmission unit in a rotationally fixed manner in at least one direction of rotation and, in a second shift position of the shift means, can be decoupled from the component of the transmission unit in each direction of rotation, and wherein the shift means is arranged in conjunction with the drive shaft in such a way that at least a part of the shift means rotates with a rotation of the drive shaft about the center axis. Disadvantageously, in order to change the switching position of the switching means, a relative rotation of the switching shaft to the drive shaft must be generated, which takes place via a planetary gear that must be operated by means of a cable operated by the operator, in particular a Bowden cable. If the switching means are placed under load, i.e. if torque is applied, the clamping forces of the switching means in the switching partners can become very high, making it impossible to connect the switching means under load using a Bowden cable, an oil column, a chain or similar.

Other switching systems of the type of interest here are known from EP 0 910 530 B1, US 2011/011193 A1, EP 2 718 174 A1 or DE 10 49 714 B1.

Known shift systems are in this respect designed such that in general the power throughput, and consequently therefore the torque at the drive shaft, has to be interrupted to carry out a gear change. This is in particular due to a force flow through the switch element itself that has to be taken out of engagement with a component of the gear unit, with the movement of the switch element having to be caused by an operating force of an operator. If a switch element is in force flow with the component of the gear, in particular if a torque is applied to the drive shaft, and if a gear change should take place, the engagement of the switch element has to be released from the component of the gear with great force, which is not possible by means of a Bowden cable or the like.

SUMMARY OF THE INVENTION

The object of the invention is the improvement of a shift system and of a gear unit shiftable using such a shift system that are in particular suitable for a two-wheeled vehicle, preferably for a bicycle, wherein the gear change of the gear unit should also be possible without a load interruption.

This object is achieved starting from a shift system as described herein and starting from a gear unit as described herein in conjunction with the respective characterizing features. Advantageous further developments of the invention are also described.

To achieve the object, the invention proposes that the relative movement of the switch element relative to the selector shaft is induced by the part of the switch element rotating with the drive shaft, so that the movement of the switch element between the first and the second selected position is effected by a force branched off from the drive movement of the drive shaft.

The core idea of the invention is the utilization of the drive force or of the drive torque in the external drivable drive shaft to cause a movement of the switch element so that it is possible to change between the first selected position and the second selected position of the switch element. A small portion of the drive power in the drive shaft is so-to-say branched off to generate the movement of the switch element, in particular from the first selected position into the second selected position.

It is proposed for this purpose in accordance with the invention that the switch element is configured in conjunction with the drive shaft, that is in particular connected to the drive shaft or is arranged therein or thereat, so that at least a portion of the switch element co-rotates with the drive shaft, preferably the entire switch element. A relative movement of the switch element can be induced by means of the selector shaft by the rotation of the switch element with the drive shaft so that the selector shaft can shift the switch element without large forces or torques having to be introduced into the selector shaft to move the switch element since the movement of the switch element takes place by a branched off force from the drive movement of the drive shaft.

The switch element can be made in one piece, for example in the form of a single-part switch element, or the switch element is designed in multiple parts so that at least a portion of the multipart switch element co-rotates with the drive shaft. In the simplest and preferred case, the entire switch element co-rotates as the single-part switch element with the drive shaft in that the switch element is movably received in or at the drive shaft and it also co-performs the rotation of the drive shaft about the center axis.

In this respect, only the selector shaft is connected to a corresponding element via which an operator can move the selector shaft, with the selector shaft itself not requiring any large selection forces for this function. The selector shaft only comes into contact with one part, with a functional surface or with a functional section of the switch element, and, in accordance with the basic idea of the invention, the selector shaft can change the functional environment of the selector shaft to a certain degree such that the switch element carries out the desired movement between the first selected position and the second selected position, in particular from the first selection position to the second selection position.

For this purpose, the selector shaft provides a corresponding geometry that moves along at least partially into the movement region, in particular into the trajectory about the center axis, of the switch element co-rotating with the drive shaft by displacement of the selector shaft either radially or axially to accordingly act on the switch element and to change the selected position.

In accordance with an advantageous embodiment of the shift system, at least the part of the switch element rotating with the drive shaft or the entire single-part switch element has at least one pickup in contact with the selector shaft. The pickup can thus be displaced axially and/or radially with respect to the center axis of the shift system, that preferably also forms the center axis of the gear unit, by the movement of the selector shaft to finally change the selected position of the switch element, in particular to switch the switch element from the first selected position to the second selected position.

The pickup can be formed as a geometrical aspect at the switch element itself, in particular when the switch element is designed in one part as a shift pawl. The pickup can be designed as a pickup head via which the switch element moves into contact with the selector shaft.

As part of a possible further embodiment of the shift system, the selector shaft has at least one ramp or a ramp element is provided that interacts with the selector shaft. The ramp can be provided as a single component that enters into interaction with the selector shaft or the ramp is advantageously formed at the selector shaft itself. The pickup as a part of or in an arrangement at the shift system can move into contact with the ramp so that the pickup and thus also a part of the switch element is axially and/or radially displaceably relative to the center axis of the shift system, with a displacement of the ramp being able to be produced by means of the movement of the selector shaft.

The ramp is advantageously designed as a peripherally acting ramp so that the pickup is radially moved with respect to the center axis by means of the rotational movement of the drive shaft. It is, however, also conceivable that the ramp is designed as axially active or the ramp is designed such that the pickup is displaced axially and radially. Within the framework of the invention, the ramp can to this extent comprise any geometrical design that is suitable to displace the pickup either radially or axially with respect to the center axis so that a displacement of at least a part or of an entire switch element also takes place and so that the switch element can switch between the first selected position and the second selected position by this displacement, can in particular be oved from the first selected position to the second selected position. Expanding sleeves, tapering elements, conical elements, and the like, preferably also with elastically deformable sections, are also conceivable in this connection to provide a ramp that can change a diameter in a radial observation, similar to breathing in and out. A device that can be acted on by a fluid, for example by means of compressed oil, is furthermore conceivable to temporarily change a radial position or a diameter of a ramp.

One main aspect in the geometrical design of the selector shaft in conjunction with the switch element and/or the pickup provides that the direction of movement in which the selector shaft moves the ramp into contact with the pickup and the direction of actuation of the pickup, in particular as a part of the switch element, extend perpendicular to one another. The force on the selector shaft is introduced into the selector shaft by the operator in its direction of movement together with the ramp so that the force for moving the selector shaft tends to be small. In contrast, the pickup and thus also a part of the switch element or the switch element itself has to be moved in its direction of actuation by a large force, with the force that is large in relation to the small force of the movement of the selector shaft being induced by the geometry at the selector shaft, in particular by the ramp. The large force is here provided by the drive force or the drive torque of the drive shaft, with the small force being introduced by the operator, for example by means of a rotational activator.

The shift system can in particular also be shifted by an electrical actuator so that the selector shaft is set into motion not, for example, by a person via Bowden cables, but rather by means of an electrical actuator. The electrical actuator can here also be part of the shift system and the electrical actuator can ultimately be controlled, for example, by the operator in accordance with the remote principle.

In order also to design the shift system for an idling gear such that a gear change can take place, the selector shaft or a component connected to the selector shaft can be designed such that the pickup of the switch element is movable by means of the shift movement of the selector shaft independently of the rotational movement of the drive shaft between the first selected position and the second selected position, in particular by means of at least one axially slanting ramp at the selector shaft or at a component connected to the selector shaft. The axial-radial, i.e. axial and tapering or cone-like, ramp can be arranged adjacent to or in a uniform construction with the ramp that forms a slanting surface between the peripheral surfaces of different diameters at the selector shaft between which the pickup can change its contact.

The ramp that extends in the peripheral direction and that has a growing radius with respect to the center axis can shift the switch element when the switch element co-rotates with the drive shaft about the center axis and the axial-radial ramp that at least sectionally forms a taper or a cone can shift the switch element when the switch element is stationary and does not rotate about the selector shaft, but when the selector shaft and thus the axial-radial ramp is axially displaced relative to the switch element.

The switch element can be designed as a dog clutch and preferably as a shift pawl or as a shift pawl system. The switch element can in particular form a shift pawl that can engage into a latch contour or engagement contour in the gear component that is in particular formed on an inner surface so that the gear component forms the counter switch element to this extent. The switch element can consequently relate to any component that is suitable and configured to rotationally fixedly connect a further component to the component in at least one direction, in or at which the switch element is received, by a movement between two selected positions.

The gear unit advantageously has at least one planetary gear; the gear unit in particular consists of two planetary gears. The component connectable to the drive shaft in accordance with the invention can be an annulus gear, a planet carrier, and/or a sun gear of the planetary gear or at least one of the planetary gears or both planetary gears.

The switch procedure of the switch element into the second selected position can be carried out by means of the contact of the ramp with the pickup, with the pickup also being able to form only a simple functional surface at the single-part switch element. The switch procedure from the first selected position into the second selected position consequently takes place via the ramp contact, with a change of the selected position from the second selected position into the first selected position preferably taking place free of any contact of the pickup with the ramp. In particular a tension spring can be configured for this purpose that urges the switch element into the first selected position.

The moving of the switch element from the second selected position out of engagement with the component of the gear unit into the first selected position in engagement with the component of the gear unit can take place with only minimal force effort in this respect since the switch element, that is in particular the shift pawl, the dog clutch, or the like is not yet in force flow that is produced by the power throughput through the gear unit via the drive shaft. To this extent, a moving of the switch element from the first selected position into the second selected position takes place using a simple tension spring by way of example.

Further advantageously, the selector shaft has a first section having a smaller diameter and a second section having a larger diameter. The sections in particular form sections having a cylindrical jacket surface, consequently therefor annular sections, that have an unchanging diameter over the full circumference. The change between the selected positions of the switch element can take place here by a contact change of the switch element, and in particular of the pickup of the switch element, between the sections via the ramp so that the ramp switches the pickup of the switch element or the switch element itself between the first section and the second section.

The selector shaft is in particular multipart and a first selector shaft and a second selector shaft are advantageously configured that are axially movably, but rotationally rigidly, connected to one another. The two parts of the selector shaft can adopt different axial positions due to a division of the selector shaft so that a plurality of switch element can be shifted independently of one another by a plurality of parts of the selector shaft.

A passage shaft is in particular provided as a part of the shift system and/or as a part of the gear unit that extends along the center axis and on which the first and second selector shafts have been received, with the first selector shaft having a first guide link in which a first guide element arranged in the passage shaft is guided. The second selector shaft furthermore has a second guide link in which a second guide element arranged at the passage shaft is guided. Consequently, the axial positions of the first and/or second selector shafts can be varied independently of one another along the center axis. The drive shaft likewise extends about the passage shaft and is in particular supported thereon, with the drive shaft preferably being designed as a hollow shaft in which the selector shaft extends. The selector shaft is furthermore preferably designed as a hollow shaft through which the passage shaft extends.

The shift system furthermore advantageously has a rotational activator that is configured to move the selector shaft accordingly, in particular to set it into a rotational movement. The rotational activator is to this extent operatively connected to the selector shaft, with the rotational activator being able to be controlled by an operator. The rotational activator has Bowden cables, for example. The selector shaft can be set into rotational movement by the rotational activator, with the rotational movement in turn being able to be switched into an axial movement of the selector shaft or in parts of the selector shaft. Consequently, on an activation of the rotational activator, the selector shaft or parts of the selector shaft can be radially and/or axially displaced or rotated about the center axis.

The invention is further directed to a gear unit having at least one shift system in accordance with the above description, with the gear unit comprising at least one planetary gear, in particular two planetary gears, with the component of the planetary gear to which the drive shaft is rotationally fixedly connectable in at least one direction of rotation of the gear unit by means of the switch element being designed as an annulus gear, as a planetary carrier, and/or as a sun gear of the at least one planetary gear. The output of the planetary gear is formed by a planetary carrier, for example, with the planetary carrier, as the component for shifting by means of the shift system being the planetary carrier of a first planetary gear and with the planetary carrier for forming the output being the planetary carrier of a second planetary gear.

The two or more mutually nested planetary gears are in particular configured coaxially with one another and are in particular nested in one another, with the annulus gear, the planetary carrier, and/or the sun gear being able to be shifted by the first and/or by the second planetary gear by means of the shift system, with more than two planetary gears also being configured nested with one another.

A shift system in accordance with the invention can furthermore be complemented by a freewheel unit active between the respective shifted component and a fixedly stationary part of the shift system. Additionally or alternatively, the gear unit has at least one freewheel. A first freewheel can be configured that forms an operative connection between the annulus gear of the second, outwardly disposed planetary gear and a fixedly stationary part of the gear unit. A second freewheel can be configured that forms an operative connection between the planetary carrier of the first, inwardly disposed planetary gear and the fixedly stationary part, with a third freewheel also in particular being able to be provided that forms an operative connection between the sun gear and the drive shaft.

BRIEF DESCRIPTION OF THE DRAWINGS

Further measures improving the invention will be shown in more detail below together with the description of a preferred embodiment of the invention with reference to the Figures. There are shown:

FIG. 7 is a perspective view of a switch element designed as a shift pawl;

FIG. 8 is a further perspective view of the switch unit with the arrangement of a plurality of shift pawls in connection with the drive shaft in a sectional representation; and FIG. 8a is a perspective view of the sun gear of the inner planetary gear.

DETAILED DESCRIPTION OF THE INVENTION

Figure 1:
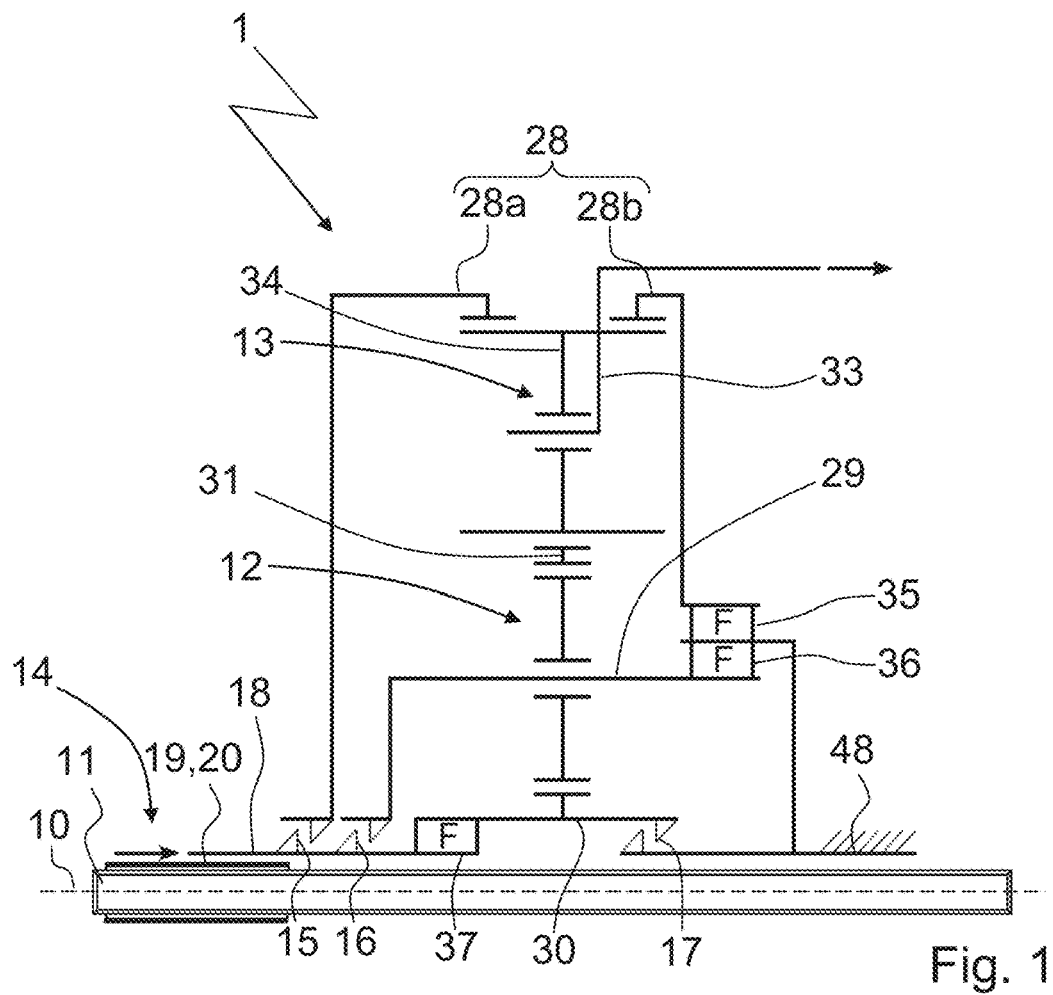
FIG. 1 is an equivalent circuit diagram of a gear with the shift system in accordance with the invention.

FIG. 1 shows an equivalent circuit diagram of a gear unit 1 in an upper half-section, with the shift system 14 in accordance with the invention being shown. A passage shaft 11 that can be attached in a resting manner at the frame of a two-wheeled vehicle, for example and that can also not rotate to this extent, extends through the gear unit 1 as a carrying element. The passage shaft 11 extends along a center axis 10 that simultaneously forms the axis of rotation of the two planet gears 12 and 13. The planetary gear 12 forms an inner planetary gear and the planetary gear 13 forms an outer planetary gear, the two in particular being formed lying in one another.

A drive shaft 18 that can be driven by a rider or by a motor of the two-wheeled vehicle and that forms a part of the shift system 14 extends about the passage shaft 11. The drive shaft 18 receives the switch element 15 and 16, with the switch element 15 cooperating with an annulus gear 28 of the planetary gear 13 and the switch element 16 cooperating with a planet carrier 29 of the inner planetary gear 12. The switch element 17 cooperates with a sun gear 30 of the inner planetary gear 12 and is received at a fixedly stationary part 48 of the gear unit 1 and thus provides an operative connection of the inner sun gear 30 to the fixedly stationary part 48 and to this extent also to the passage shaft 11. The switch element 17 is thus also part of the switch element 14.

The annulus gear 28 of the outer planetary gear 13 is divided into two parts with respect to the direction of extent of the center axis 10 so that a first part gear 28a is produced shown on the left and a second part gear 28b is produced shown on the right. An axial gap is thereby produced between the part gears 28a and 28b through which the output of the gear unit 1 is guided, with the output being formed, in a manner not shown in any more detail, by the casing of the gear unit 1 that is rotationally rigidly coupled to the outer planetary carrier 33 of the second planetary gear 13. The output can, for example, form a casing of the gear unit, not shown in any more detail, that is connected to the planetary carrier 33 by the gap between the part gears 28a and 28b.

The outer planet gears 34 engage in both part gears 28a, 28b of the annulus gear 28 so that the part gears 28a, 28b are rotationally rigidly connected to one another by means of the outer planet gears 34.

The first planetary gear 12 is arranged at the inner side and the second planetary gear 13 is arranged at the outer side, with both planetary gears 12, 13 being arranged lying in one another and the annulus gear of the first, inwardly disposed planetary gear 12 being of uniform construction with the sun gear of the second, outwardly disposed planetary gear 13 and thus forming the annulus sun gear 31.

The fixedly stationary part 48 at which the switch element 17 is received and that cooperates with the sun gear 30 can also be formed as part of the passage shaft 11, with the fixedly stationary part 48 advantageously forming a single component or a component group to which the freewheels 35 and 36 are also connected, while the freewheel 37 is configured between the inner sun gear 30 and the drive shaft 18. The freewheel 35 forms an operative connection of the fixedly stationary part 48 to the part gear 28b, while the freewheel 36 forms an operative connection of the fixedly stationary part 48 to the planetary gear 29.

Figure 2:
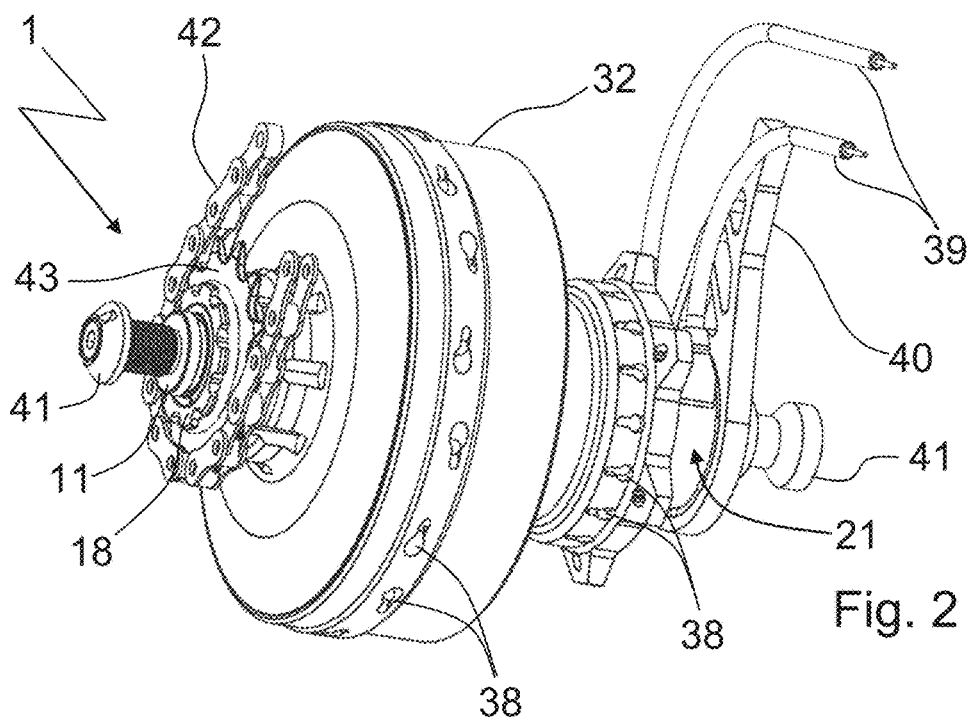
FIG. 2 is a perspective view of the gear.

FIG. 2 shows a perspective view of the gear unit 1 having a drive, shown by a chain 24 that is guided over a chain pinion 43 and the chain pinion 43 is directly operatively connected to the drive shaft 18. The passage shaft 11 that can be fastened to the frame of a two-wheeled vehicle, in particular of a bicycle, by the hub screws 41 extends through the gear unit 1 so that the passage shaft 11 is rotationally rigidly and restingly arranged. In this respect, a fastening arm 40 that is likewise attached to the frame of the two-wheeled vehicle is located at the passage shaft 11 in a rigid arrangement to stabilize torques occurring in the gear unit 1.

The control of the gear unit 1 takes place via Bowden cables 39 that cooperate with a rotational activator 31 that is likewise rigidly connected to the passage shaft 11 and that is shown as a functional unit. The output of the gear unit 1 takes place via the casing 32 that has means 38 for receiving wheel spokes.

Figure 3:
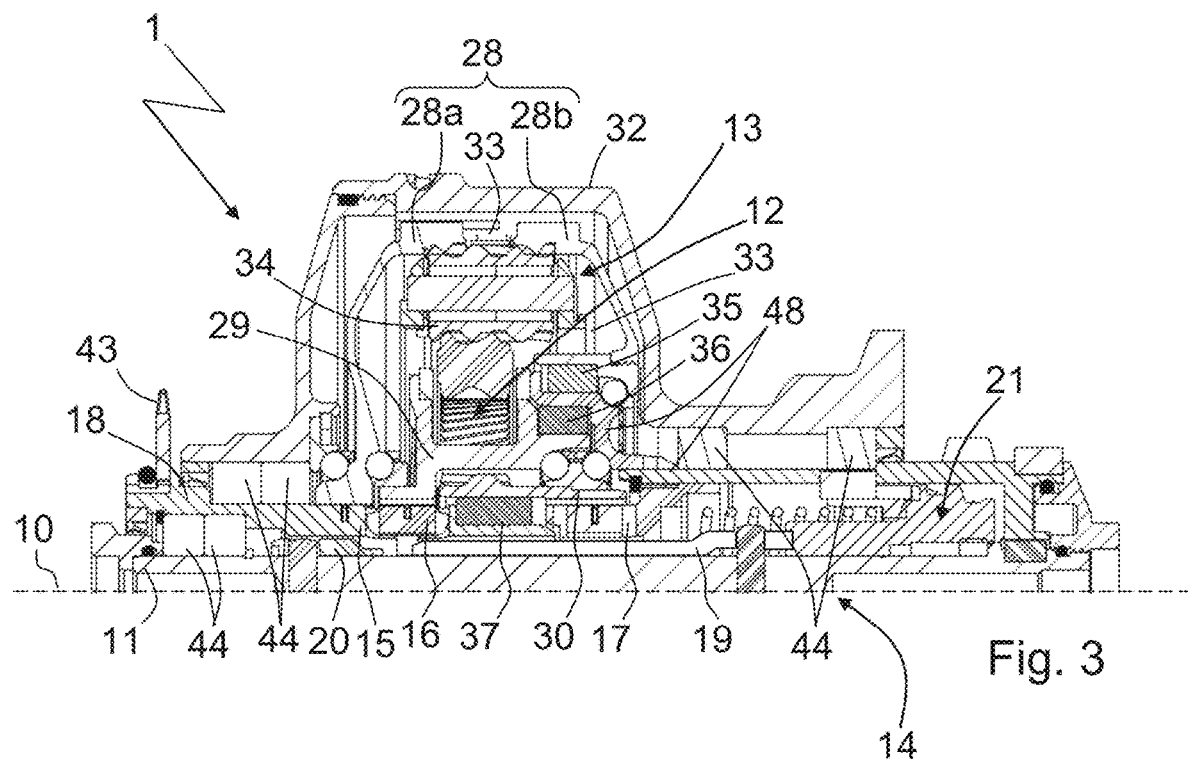
FIG. 3 is a section through the gear with the shift system in accordance with the invention.

FIG. 3 shows an upper half-section of the gear unit 1 and the passage shaft 11 that extends in the center axis 10 and is rigidly arrangeable at the frame of the two-wheeled vehicle is in turn shown as a main component.

The drive shaft 18 that is designed as hollow and on which the chain pinion 43 for the rotary drive of the drive shaft 18 is received extends sectionally about the passage shaft 11. The roller element bearings 44 of the drive shaft 18 are received in a supporting manner on the passage shaft 11. At the inner side, the drive shaft 18 has, toward the outer circumference of the passage shaft 11, a radial gap in which the selector shafts 19 and 20 partially extend from a side disposed opposite the arrangement of the chain pinion 43. The switch element 15 and 16 are received in or at the drive shaft 18 so that the switch element 15 and 16 also rotate to this extent about the selector shafts 19 and 20 with the rotation of the drive shaft 18 about the passage shaft 11. The switch element 17 is received at the fixedly stationary part 48. The switch element 15 is shown in rotated form in the section for the purposes of the view and is actually located at an offset position on the circumference about the center axis 10, with all the switch element 15, 16, 17 each being present pairwise at oppositely disposed positions.

The first, inner planetary gear 12 and the outer, secondary planetary gear 13 with their individual components can be shifted by the switch element 15, 16, and 17. The planetary gears 12 and 13 are received within the casing 32 of the gear unit 1, with the casing 32 serving as the output of the gear unit 1 while the drive shaft 18 serves as the drive.

The switch unit 14 has a rotational activator 21 that is operatively connected to the selector shafts 19 and 20 and that can be activated by an operator to introduce a step-wise, staged rotational movement in discrete angular increments into the selector shaft 19, 20. The stepwise rotational movement in the selector shafts 19, 20 takes place here relative to the resting passage shaft 11 and is converted— as described below— into an axial movement along the center axis 10.

The selector shaft 19, 20 is in two parts and has a first selector shaft 19 and a second selector shaft 20, with the first and second selector shafts 19, 20 being configured rotationally rigidly but axially movably with respect to one another.

A first component of the planetary gear 12, 13 forms the annulus gear 28 of the outer, second planetary gear 13, with the annulus gear 28 being divided into a first part gear 28a and into a second part gear 28b. The first switch element 15 or a pair of first switch element 15 here interacts with the annulus gear 28, represented by the first part gear 28a, to connect it rotationally rigidly to the drive shaft 18 on engagement of the switch element 15. A further component of the planetary gear 12, 13 is represented by the planetary carrier 29 that is part of the inner, first planetary gear 12, with the second switch element 16 or a pair of second switch element 16 cooperating with the planetary gear 29 to rotationally rigidly connect it to the drive shaft 18 on engagement.

Finally, a further shiftable component of the planetary gears 12, 13 is represented by means of the sun gear 30 of the first, inner planetary gear 12, with the third switch element 17 cooperating with the sun gear 30 to rotationally rigidly connect it to a fixedly stationary part 48 of the gear unit 1 on engagement. The switch element 17 is to this extent not received at the drive shaft 18, but rather at a fixedly stationary part 48 that can also be formed in multiple members.

The casing 32 of the gear unit 1 is supported at the fixedly stationary part 48 and furthermore rotatably supported via the drive shaft 18 by means of roller element bearings 44, with the casing 32 serving as the drive element. For this purpose, the casing 32 is connected to the outer planetary carrier 33 of the second, outer planetary gear 13. The connection takes place by the axial gap between the part gears 28a and 28b of the annulus gear 28 so that one or more webs of the outer planetary carrier 33, distributed over the circumference, are connected at least indirectly, in particular via elastic coupling elements, in an arrangement between the circumferential positions of the outer planet gears 34.

The first shown freewheel 35 forms an operative connection between the annulus gear 28 of the second, outwardly disposed planetary gear 13 and the fixedly stationary part 48. The second shown freewheel 36 forms an operative connection between the planetary carrier 29 of the first, inwardly disposed planetary gear 12 and the fixedly stationary part 48, with a third freewheel 37 being provided that forms an operative connection between the sun gear 30 and the drive shaft 18.

If the gear unit 1 is switched to the neutral NO, all the switch element 15, 16, and 17 are retracted and are not in engagement with the components of the planetary gear 12, 13 in this position.

For a first speed N1, only the switch element 15 is extended and brought into engagement with the annulus gear 28, while the further switch element 16, 17 are not in engagement.

For the second speed N2, only the switch element 16 is extended and brought into engagement with the planetary carrier 29, while the switch element 15 and 17 remain retracted.

For the third speed N3, the switch element 15 and the switch element 17 are brought into engagement with the annulus gear 28 or with the sun gear 30.

For the fourth speed N4, the switch element 15 remains retracted, while the switch element 16 and 1 are moved into engagement with the planetary carrier 29 and/or the sun gear 30.

For the fifth speed N5, the switch element 15 and the switch element 16 are extended, while the switch element 17 remains retracted.

For the sixth speed N6, finally, all three switch element 15, 16, and 17 are extended and moved into engagement with the respective components of the planetary gears 12, 13.

Figure 4:
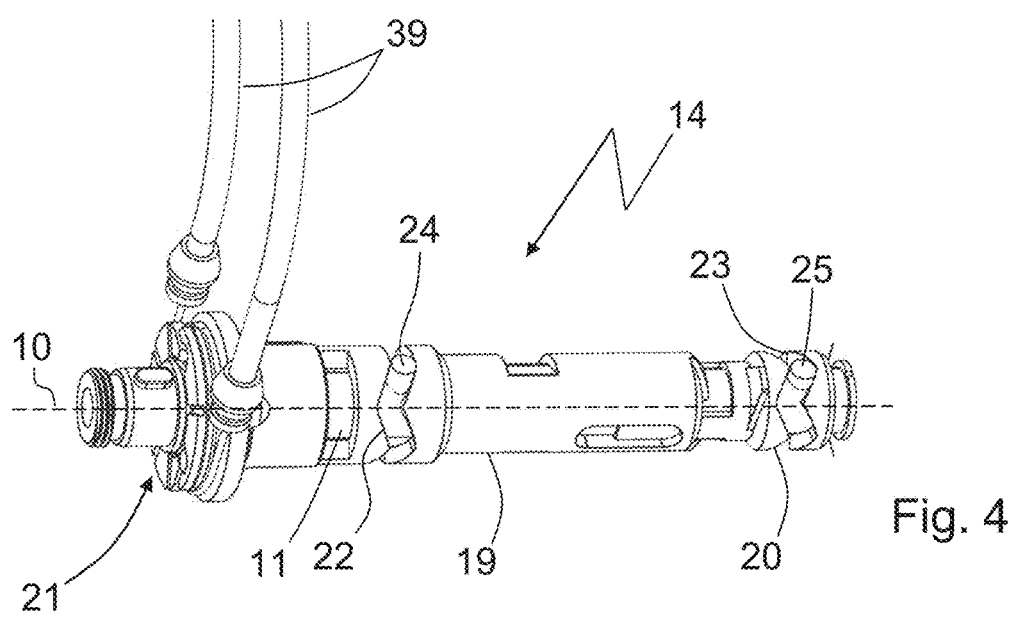
FIG. 4 is a perspective view of the switch unit with two selector shafts in connection with a rotational activator, but without the drive shaft.

FIG. 4 represents a perspective view of the switch unit 14 with the selector shafts 19 and 20 in an arrangement on the passage shaft 11, with the rotational activator 21 furthermore being shown with the Bowden cables 39.

The selector shaft 19 has a guide link 22 in which a guide element 24 is guided. The guide element 24 is rigidly arranged at the passage shaft 11 and migrates through it transversely to the center axis 10. The guide link 22 has a zig-zag contour so that a direction changing axial movement is introduced along the center axis 10 into the selector shaft 19 on a rotation of the selector shaft 19 by means of the rotational activator 21.

The selector shaft 20 is admittedly received rotationally rigidly, but axially movably with respect to the selector shaft 19 so that the rotational movement can likewise by introduced into the selector shaft 20 via the selector shaft 19 by means of the rotational activator 21. A guide link 23, in which a guide element 25 is likewise guided that is rigidly attached to the passage shaft 11, is also introduced in the selector shaft 20. The guide link 23 likewise has a zig-zag contour so that the selector shafts 19 and 20 can execute a mutually independent axial movement by the two guide links 22 and 23 depending on the rotational position of the selector shafts 19 and 20 that is set stepwise by the rotational activator 21. The selector shaft 19 can here cooperate with the switch element 16 and 17, while the selector shaft 20 can cooperate with the switch element 15.

Figure 5:
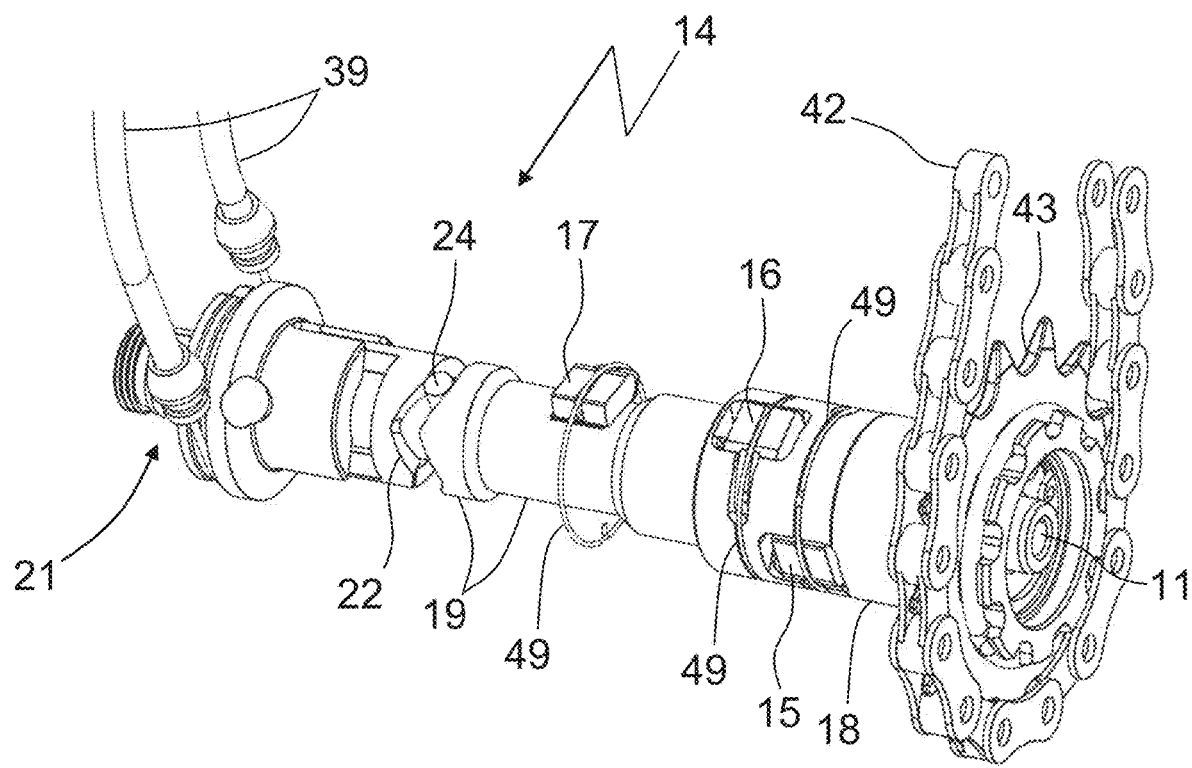
FIG. 5 is a perspective view of the switch unit with a selector shaft in connection with the rotational activator in accordance with FIG. 4, with a drive shaft furthermore being shown so that a further selector shaft is hidden.

FIG. 5 shows a further perspective view of the main components of the shift system 14, with the drive shaft 18 now being shown that is driven by the chain 42 in conjunction with the chain pinion 43. In this respect, the selector shaft 20 is arranged inwardly disposed in the drive shaft 18 and is covered by it so that only the selector shaft 19 is visible.

The switch element 15 and 16 that are each preloaded by tension springs 49 such that the switch element 15, 16 are extended and can engage into the component of the planetary gears 12, 13 are received in the drive shaft 18. The same applies to the switch element 17 that is likewise shown preloaded by a tension spring 49 and can cooperate with the shown selector shaft 19; however, the switch element 17 is not received at the drive shaft 18, but rather at the fixedly stationary part 48, not shown.

There are furthermore shown the guide link 22 in the selector shaft 19 with the guide element 24 at the passage shaft 11 and the selector shaft 19 can also be adjusted by the Bowden cables 39 in the axial position by means of the rotational activator 21 in the retracted position due to the action of the guide link 22.

Figure 6:
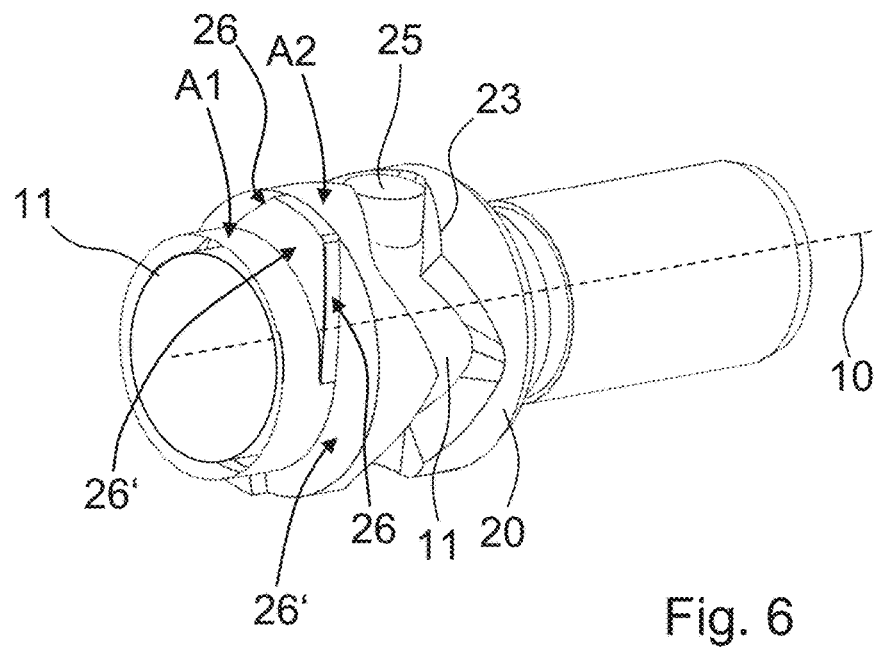
FIG. 6 is a perspective view of a first selector shaft.

FIG. 6 shows the selector shaft 20, that can be displaced along the center axis 10, in an individual representation in that it is rotatably arranged at the passage shaft 11 and in that the guide element 25 extends in the guide link 23 that Is of zig-zag form. A rotation of the selector shaft 20 about the center axis 10 consequently effects a to-and-fro displacement of the selector shaft 20 on the passage shaft 11 along the center axis 10.

The outer contour of the selector shaft 20 has a first section A1 and a second section A2, with the diameter of the first section A1 being smaller than the diameter of the second section A2. The sections A1, A2, shown by way of example, in the outer contour of the shown selector shaft 20 are likewise present in the further selector shaft 19 so that the respectively associated sections A1 and A2 of the switch element 15, 16, and optionally 17, on the selector shafts 19, 20 can cooperate. The following description of the action of the sections A1 and A2 here applies to all the sections that are associated with the respective switch element and are to this extent generally described in the following for the example of sections A1 and A2 of the selector shaft 20.

If a pickup 27, see FIG. 7, of the switch element 15, 16, 17 runs off on the first section A1, the switch element 15, 16, 17 is extended and engaged in a component of the planetary gears 12, 13, which is effected by the respective tension springs 49. If the selector shaft 20 and, in the same manner also the selector shaft 19, in a manner not shown, is axially displaced in that it is rotated about the passage shaft 11 by means of the rotational activator 21, the resulting axial displacement causes a change of the contact of the pickup 27 of the switch element 15, 16, 17 against the preload force of the tension springs 49 from the first section A1 to the second section A2.

The change can take place due to the circumferential movement of the pickup 27 along the ramp 26 so that the pickup 27 can migrate upward in a certain manner from the smaller diameter to the larger. Since the selector shaft 20 only defines the contour and the switch element 15, 16 revolve due to the rotation of the drive shaft 18 about the selector shaft 19 20, a disengagement of the engagement of the switch element 15, 16, and thus a release of the force flow from the component of the planetary gear 12, 13, also takes place without problem under load since the disengagement does not have to be initiated by means of rotational activator 21, and thus via the Bowden cables 39; the disengagement rather takes place by the drive force to drive the drive shaft 18 itself, that is therefore via the drive power. The contact of the switch element 15, 16, and also 17, with the respective associated sections A1 and A2 is held by the tension spring 49 here that is shown for each of the switch element 15, 16, 17 in FIG. 5.

The ramp 28 is formed as a ramp at the radial peripheral side and can release the pickup of the switch element from the contact with the section A1 of a smaller diameter and move into contact with the section A2 of a larger diameter when the switch element circles the selector shaft 20 so-to-say with the rotation of the drive shaft. If the drive shaft is stationary and if the pickup or the switch element adopts a fixed peripheral position, a change can nevertheless take place between the contact with the section A1 and the contact with the section A2 since the selector shaft 20 has an axial-radial ramp 26' that is formed beside and at the front side of the actual ramp 26 at the selector shaft 20. A gear change can consequently also take place while stationary. The axial-radial ramp 26' is here at least sectionally formed as a cone.

Looking at FIG. 7, a simple pivoting of the switch element 15, 16, 17 about the pivot axis 45 is sufficient to move the switch element 15, 16, 17 between the selected positions, with the blocking section 46 on the front side of the switch element 15, 16, 17 in particular being convexly contoured such that a simple disengagement from the latched position of the switch element 15, 16, 17 from the component of the planetary gear 12, 13 can take place simply and with minimal force.

FIG. 8 shows a sectioned view of the switch unit 14 with the drive shaft 18 with the adjoining rotational activator 21 in operative connection with the selector shaft 19. The switch element 16 are shown in a two-fold oppositely disposed arrangement, with the switch element 16 being received in the drive shaft 18 and running off over the first section A1 of the selector shaft 19. The switch element 15, not shown by the sectional view, is received in the drive shaft 18 in the same way and the switch element 17 in conjunction with the tension spring 49 is not in an arrangement in or at the drive shaft 18.

FIG. 8a finally shows a sun gear 30 of the first inner planetary gear 12 having inwardly disposed pinion pockets 47 in which the blocking sections 46 of the switch element 17 can engage.

The invention is not restricted in its design to the preferred embodiment specified above. A number of variants is rather conceivable that also makes use of the solution shown with generally differently designed embodiments. All the features and/or advantages, including any construction details or spatial arrangements, originating from the claims, the description, or the drawings can be essential to the invention both per se and in the most varied combinations.

REFERENCE NUMERAL LIST

1 gear unit
10 center axis
11 passage shaft
12 planetary gear
13 planetary gear
14 shift system
15 switch element
16 switch element
17 switch element
18 drive shaft
19 selector shaft
20 selector shaft
21 rotational activator
22 guide link
23 guide link
24 guide element
25 guide element 26 ramp
26' ramp
27 pickup
28 annulus gear
28a first part gear
28b second part gear
29 planetary carrier
30 sun gear
31 annulus sun gear
32 casing
33 outer planetary carrier
34 outer planet gear
35 first freewheel
36 second freewheel
37 third freewheel
38 means for receiving wheel spokes
39 Bowden cable
40 fastening arm
41 hub screw
42 chain
43 chain pinion
44 roller element bearing
45 pivot axis
46 blocking section
47 pinion pocket
48 fixedly stationary part
49 tension spring
A1 first section
A2 second section

The invention claimed is:

1. A shift system for shifting a gear unit, comprising:
at least one movably arranged selector shaft; and
at least one switch element;
wherein a selected position of the switch element is variable relative to the switch element by a movement of the selector shaft; and
wherein a drive shaft rotatable about a center axis is configured as part of the shift system such that the drive shaft is rotationally fixedly connected to a component of the gear unit in at least one direction of rotation in a first selected position of the switch element, and is disconnectable from the component of the gear unit in any direction of rotation in a second selected position of the switch element;
and whereas
the switch element is configured in conjunction with the drive shaft such that at least a portion of the switch element co-rotates about the center axis with a rotation of the drive shaft; and
the relative movement of the switch element relative to the selector shaft is induced by the part of the switch element rotating with the drive shaft, so that the movement of the switch element between the first and the second selected position is effected by a force branched off from the drive movement of the drive shaft.

2. The shift system in accordance with claim 1, wherein at least the part of the switch element rotating with the drive shaft has at least one pickup that is movable into contact with the selector shaft, with the pickup being axially and/or radially displaceable with respect to the center axis by the movement of the selector shaft to move the switch element into the second selected position.

3. The shift system in accordance with claim 2, wherein the selector shaft has at least one ramp and/or interacts with at least one ramp, with the pickup being axially and/or radially displaceable with respect to the center axis by movement of the pickup circulating about the center axis in contact with the ramp, with a displacement of the ramp being induced by the movement of the selector shaft.

4. The shift system in accordance with claim 2, wherein a direction of movement in which the selector shaft moves the ramp in contact with the pickup and a direction of actuation of the pickup of the selector shaft extend perpendicular to one another.

5. The shift system in accordance with claim 2, wherein the selector shaft is designed such that the pickup of the switch element is movable between the first selected position and the second selected position by the selection movement of the selector shaft independently of the rotational movement of the drive shaft, in particular by at least one ramp formed axially slantingly at the selector shaft or at a component connected to the selector shaft.

6. The shift system in accordance with claim 1, wherein the switch element is designed as a dog clutch, as a shift pawl, or as a shift pawl system.

7. The shift system in accordance with claim 3, wherein a switch procedure of the switch element into the second selected position can be carried out by contact of the ramp with the pickup and/or a tension spring is configured that urges the switch element into the first selected position.

8. The shift system in accordance with claim 1, wherein the selector shaft has a first section having a smaller diameter and a second section having a larger diameter, whereas the shift system is configured such that a change between the switched positions of the switch element taking place by a change of contact of the switch element and in particular of the pickup via the ramp between the first section and the second section.

9. The shift system in accordance with claim 2, wherein a first selector shaft and a second selector shaft are connected to one another axially movably and rotationally rigidly.

10. The shift system in accordance with claim 9, wherein:
a passage shaft is provided that extends along the center axis and on which the first and second selector shafts are received, with the first selector shaft having a first guide link in which a first guide element arranged at the passage shaft is guided and/or the second selector shaft has a second guide link in which a second guide element arranged at the passage shaft is guided so that axial positions of the first and/or second selector shafts are independent of one another along the center axis.

11. The shift system in accordance with claim 1, wherein a rotational activator is operatively connected to the selector shaft, with the rotational activator being actuable by an operator to initiate a rotational movement in the selector shaft, with the at least one selector shaft being operatively connected rotationally fixedly and axially displaceably to the rotational activator.

12. A gear unit having at least one shift system in accordance with claim 1, wherein the gear unit comprises:
at least one planetary gear; and
wherein a component of the at least one planetary gear to which the drive shaft is rotationally fixedly connected in at least one direction of rotation of the gear unit by the switch element is an annulus gear, a planetary carrier, and/or a sun gear of the at least one planetary gear.

13. The gear unit in accordance with claim 12, wherein two or more planetary gears nested with one another and/or in one another are configured, with the annulus gear, the planetary carrier, and/or the sun gear being shiftable by the first and/or at least one second planetary gear by the shift system.

14. The gear unit in accordance with claim 12, wherein two of the at least one planetary gear are interleavedly arranged to each other, wherein the gear unit comprises a freewheel that forms an operative connection between the annulus gear of the second, outwardly disposed planetary gear and a fixedly stationary part of the gear unit.

15. The gear unit in accordance with claim 12, wherein two of the at least one planetary gear are interleavedly arranged to each other, wherein the gear unit comprises a freewheel that forms an operative connection between the planetary carrier of the first, inwardly disposed planetary gear and the fixedly stationary part.

16. The gear unit in accordance with claim 12, wherein two of the at least one planetary gear are interleavedly arranged to each other, wherein the gear unit comprises a freewheel that forms an operative connection between the sun gear of the first, inwardly disposed planetary gear and the drive shaft.

\* \* \* \* \*